United States Patent
Vogels et al.

(10) Patent No.: US 6,795,149 B2
(45) Date of Patent: Sep. 21, 2004

(54) LIQUID CRYSTAL REFLECTIVE DISPLAY

(75) Inventors: Joost Peter André Vogels, Eindhoven (NL); Frans Leenhouts, Heerlen (NL); Peter Van De Witte, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 14 days.

(21) Appl. No.: 10/208,348

(22) Filed: Jul. 30, 2002

(65) Prior Publication Data

US 2003/0025861 A1 Feb. 6, 2003

(30) Foreign Application Priority Data

Aug. 3, 2001 (EP) .............................. 01202951

(51) Int. Cl.$^7$ ........................................ G02F 1/1335
(52) U.S. Cl. ...................... 349/117; 349/106; 349/115; 349/118; 349/119
(58) Field of Search ................................ 349/106, 114, 349/115, 117–120

(56) References Cited

U.S. PATENT DOCUMENTS

| | | | |
|---|---|---|---|
| 5,555,114 A | * | 9/1996 | Narita et al. .................. 349/98 |
| 6,456,346 B1 | * | 9/2002 | Arai ............................ 349/106 |
| 6,552,767 B1 | * | 4/2003 | Kaneko ........................ 349/119 |
| 6,567,142 B1 | * | 5/2003 | Kim ............................ 349/119 |
| 6,577,364 B1 | * | 6/2003 | Tillin et al. .................. 349/119 |
| 6,603,523 B2 | * | 8/2003 | Nakamura et al. ........... 349/119 |
| 6,611,299 B1 | * | 8/2003 | Fujii et al. ..................... 349/12 |

FOREIGN PATENT DOCUMENTS

| | | | |
|---|---|---|---|
| EP | 1072926 A1 | 1/2001 | ........... G02F/1/133 |
| WO | WO0034808 | 6/2000 | ............ G02B/5/30 |

\* cited by examiner

*Primary Examiner*—Robert H. Kim
*Assistant Examiner*—Michael H. Caley

(57) ABSTRACT

This invention relates to a liquid crystal display device, comprising at least one retardation film (4), a nematic liquid crystal layer (5), and a light reflecting RGB patterned cholesteric color filter (6), for reflecting either essentially left-circular or right-circular polarized light, being characterized in that said liquid crystal layer (5) is a super twisted nematic liquid crystal layer having a twist angle in the interval 180–270 degrees, and in that the summed retardation R of the retardation film or retardation films and the liquid crystal layer is equal to approximately $R=(3+2n)\lambda/4$, where $n=0,1,2,3\ldots$.

4 Claims, 4 Drawing Sheets

US 6,795,149 B2

LIQUID CRYSTAL REFLECTIVE DISPLAY

The present invention relates to a liquid crystal display device, comprising at least one retardation film, a nematic liquid crystal layer, and a reflective cholesteric colour filter layer.

The market share of liquid crystal displays (LCD) is continuously increasing at the cost of other display technologies. This progress can be attributed to continuous improvements in size and performance and the decrease in the price of the panels. The design of LCDs for portable applications like cellular telephones and for demanding applications like PDAs differs strongly from the design of LCDs for high-end applications like monitors and TVs. For displays in telecom applications, low cost and low power are equally important as display image quality. Many challenges still remain to further improve the properties of LCDs. A performance issue that must be improved is, for example, the quality of the colours for reflective passive matrix displays, as initially described. Such display panels based on cholesteric colour filters are an attractive alternative for absorbing colour filters.

A passive matrix display with reflective colour filters in accordance with the prior art is described in the patent document U.S. Pat. No. 5,555,114. This document discloses a liquid crystal display including a cholesteric liquid crystal layer for selectively reflecting circularly polarised light having a specific wavelength. One embodiment of the inventive display basically contains a polariser, a quarter waveplate, a liquid crystal layer, and a cholesteric colour filter layer, in sequence. The driven liquid crystal layer may be a layer of ferro-electric, twisted nematic or super twisted nematic liquid crystal.

However, this display, as described in the patent document U.S. Pat. No. 5,555,114, has the problem that for twisted nematic liquid crystal, a display of high contrast that cover the entire range of the visible spectrum cannot be obtained.

Consequently, the object of the present invention is to provide a display device with twisted nematic liquid crystals, overcoming the above-described problems with the prior art, yet maintaining a fairly simple structure.

These and other objects are achieved by a liquid crystal display device, comprising a polariser, at least one retardation film, a nematic liquid crystal layer being comprised in an electro-optical cell, and a, preferably cross-linked, light reflective cholesteric colour filter layer, for reflecting either essentially left-circular or right-circular polarised light, being characterised in that said liquid crystal layer is a super twisted nematic liquid crystal layer having a twist angle in the interval 180–270 degrees, and in that the summed retardation R of the retardation film or the retardation films and the liquid crystal layer is equal to approximately $R=(3+2n)\lambda/4$, where $n=0,1,2,3\ldots$. By utilising super twisted nematic liquid crystals in the display, a multiplexable display is achieved.

Moreover, said retardation film or retardation films are preferably arranged between a front polariser and said super twisted nematic liquid crystal layer.

Said retardation layer preferably comprises a wide-band quarter-wave plate. Suitably, said wide-band quarter-wave plate consists of a quarter wave plate in combination with a half wave plate, thereby enabling the use of standard, well-tested layer components. Suitably, the front polariser, the retardation film or retardation films, the liquid crystal layer and the reflective cholesteric colour filter layer are arranged on each other in sequence.

In accordance with a preferred embodiment of the invention, said device further comprises a further retardation layer which is a twisted nematic polymeric film, being arranged between the front substrate and the super twisted nematic layer, said twisted nematic polymeric layer and super twisted nematic layer have mutually opposite twist directions.

Further preferred embodiments of the invention are described in the remaining sub-claims.

A currently preferred embodiment of the present invention will now be described in closer detail, with reference to the accompanying drawings.

FIG. 3b is a diagram showing the transmission in relation to wavelength for incident light, for a display device in accordance with FIG. 3a.

FIG. 4b is a diagram showing the transmission in relation to wavelength for incident light, for a display device in accordance with FIG. 4a.

Figure 1:
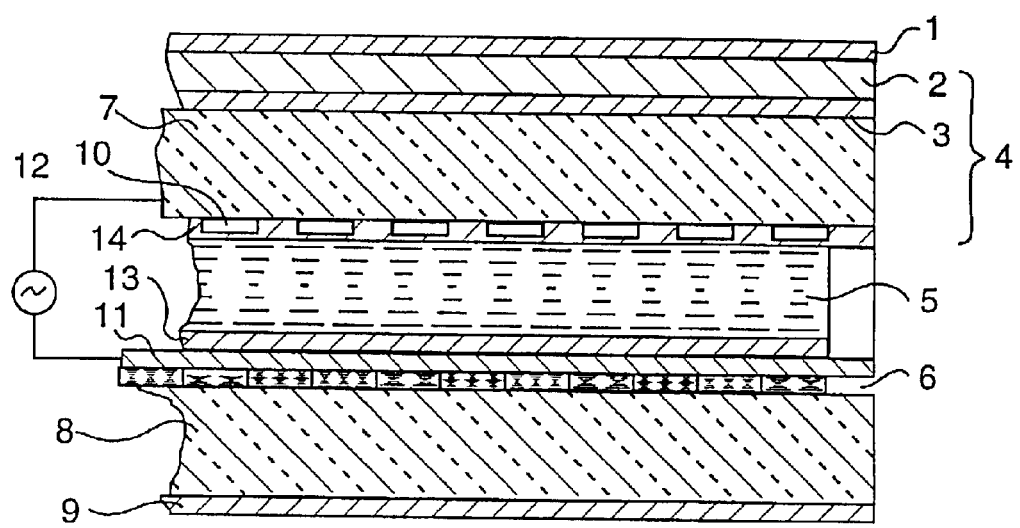
FIG. 1 is a cross-section view of a display in accordance with the invention.

FIG. 1 is a schematic, cross-sectional view of a part of a liquid-crystal reflective display device, comprising a display cell in this case comprising a super twisted nematic liquid crystal layer 5, also referred to as a LC layer, having a twist angle within the interval 180°–270°, essentially being sandwiched between two glass substrates, a front substrate 7 and a back substrate 8. On the side of the front substrate opposing said liquid crystal layer 5, a polariser 1 and one or more retardation films 4 are arranged. Further, here said combination of retardation films 4 comprises a half waveplate 2 and a quarter wave-plate 3. Between said front substrate 7 and said super twisted nematic liquid crystal layer 5, a first electrode layer 10 and a LC orientation layer 12 are arranged in sequence. Further, between said highly twisted nematic liquid crystal layer 5 and said back substrate 8, an LC orientation layer 13 a second electrode layer 11, and a reflective cholesteric colour filter layer 6 are arranged in sequence. On the side of the back substrate opposing said reflective cholesteric colour filter layer 6 an absorption layer 9 is arranged. Said first and second electrode layers 10, 11 and the orientation layers 12, 13 are formed in accordance with prior art for super twisted nematic displays, and will not be described closer herein. However, said first and second electrode layers 10, 11 are manufactured by a transparent material, such as indium tin oxide (ITO), and are connected with a power source 14, in order to enable the generation of an electric field over the super twisted nematic liquid crystal layer 5 to create an ON and an OFF state of said display on per se known manner. Further, the orientation layers are provided on both sides of the super twisted nematic liquid crystal layer in order to give the layer a desired stable orientation. The orientation layers 12, 13 may for example comprise a polymer, e.g. PI, being treated in accordance with prior art.

The above-described reflective cholesteric colour filter layer 6 basically combines a reflector function, a polariser function and a colour filter function. The cholesteric liquid crystal phase is a chiral mesophase having a natural periodicity. The liquid crystals are arranged in a screwlike fashion. When the product of the birefringence of the cholesteric material and the periodicity of the liquid crystals matches the wavelength of light in the material i.e.

$$\lambda = n \cdot p$$

(where $\lambda$ is the wavelength of the incident light, n is the refraction index of the material and p is the pitch of the material) the light will be reflected by means of Bragg reflection. Further, the screwlike liquid crystal is either left- or right-handed. Depending on the handedness of the cholesteric liquid crystals, either left-handed or right-handed circularly polarised light will be reflected. Normally, the cholesteric layer will reflect only light with wavelengths between $p \cdot n_e$ and $p \cdot n_o$, where $n_e$ and $n_o$ are the extraordinary and the ordinary refractive indices of a uniaxially oriented phase respectively. Preferably, said reflective cholesteric colour filter layer is based on a photosensitive cholesteric material. For this kind of materials, the periodicity of the cholesteric phase can be influenced by UV light. The cholesteric colour filter can be patternwise exposed to UV light with a greyscale mask. This process is advantageous in that only one exposure step is necessary in order to generate colours as described in patent document WO/0034808. This is a strong reduction compared to the manufacturing process of the conventional absorbing colour filter which usually involves three litographic steps for the subsequent deposition of red, green and blue filters.

As described above, the retardation film 4 (also referred to as retardation layer) comprises two films, a half waveplate 2, and a quarter wave-plate 3, together constituting a wide-band quarter-wave plate 4, resulting in a better overall dark state.

Figure 2:
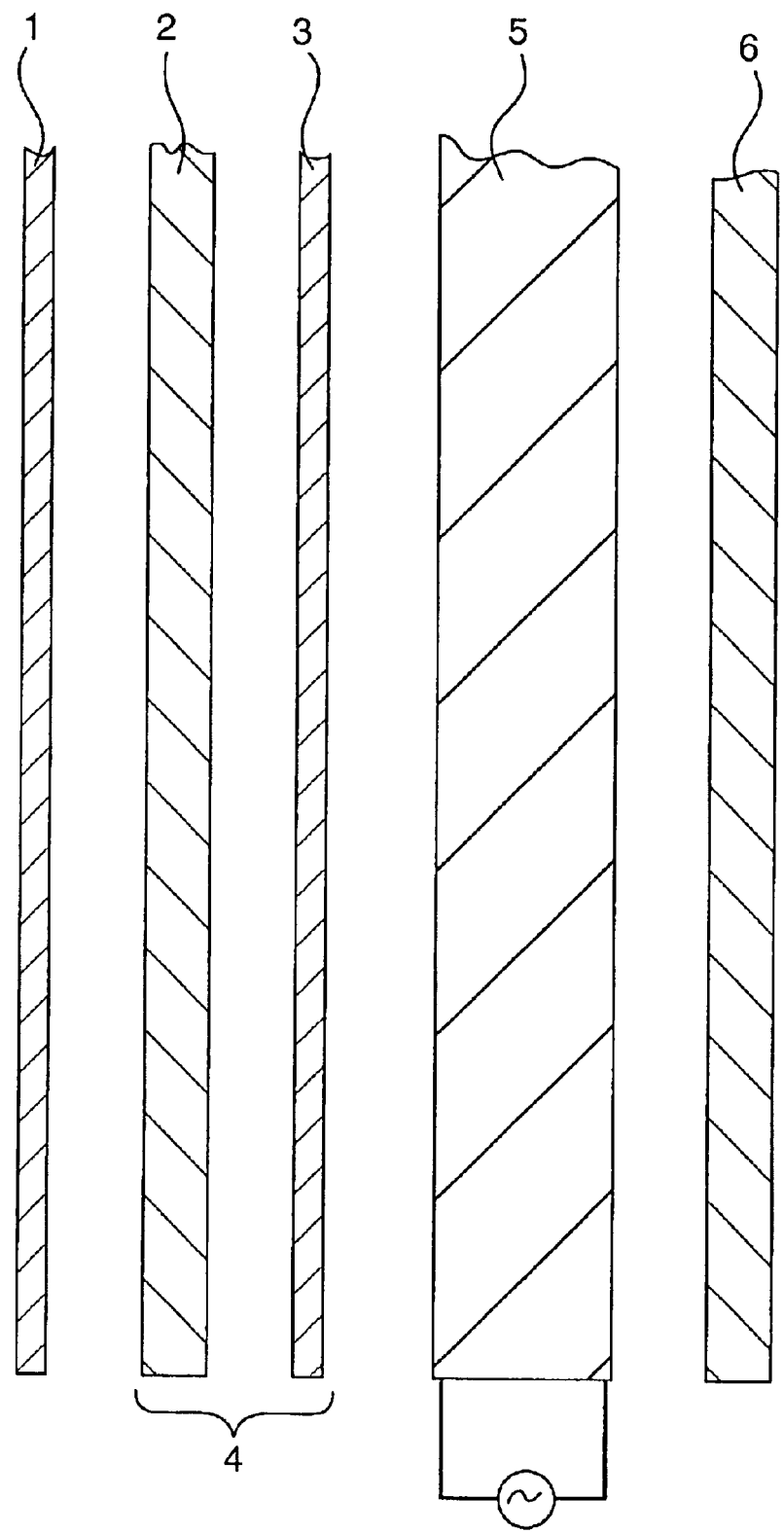
FIG. 2 is a diagram showing the optical principle mechanism of a display in accordance with FIG. 1.

A more schematic drawing, disclosing the principal optically active components of the display is disclosed in FIG. 2.

Figure 3A:
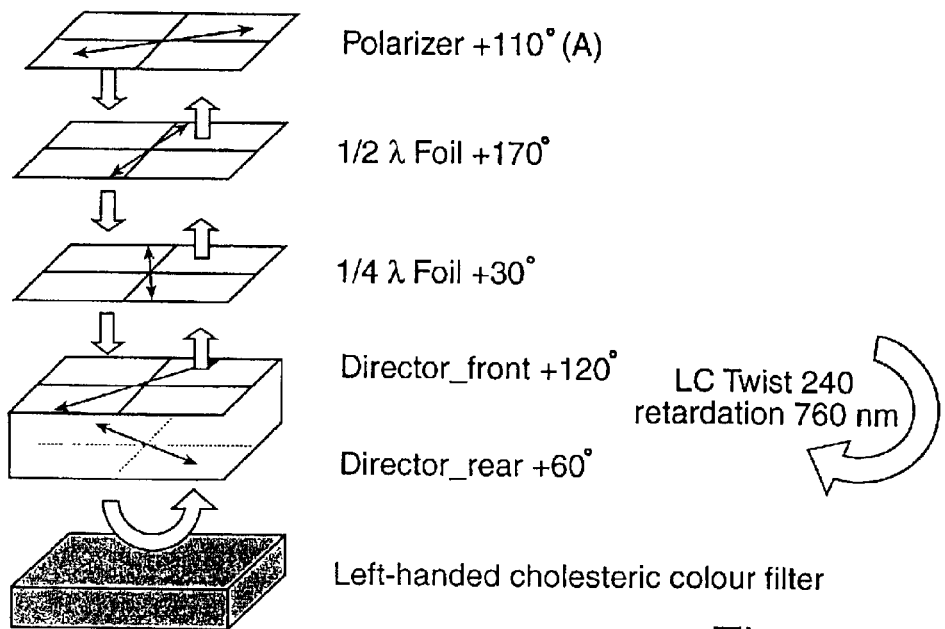
FIG. 3a is a diagram showing the optical principle mechanism in accordance with a computer simulation of a display in accordance with the invention, being optimised for obtaining high brightness.
Figure 3B:
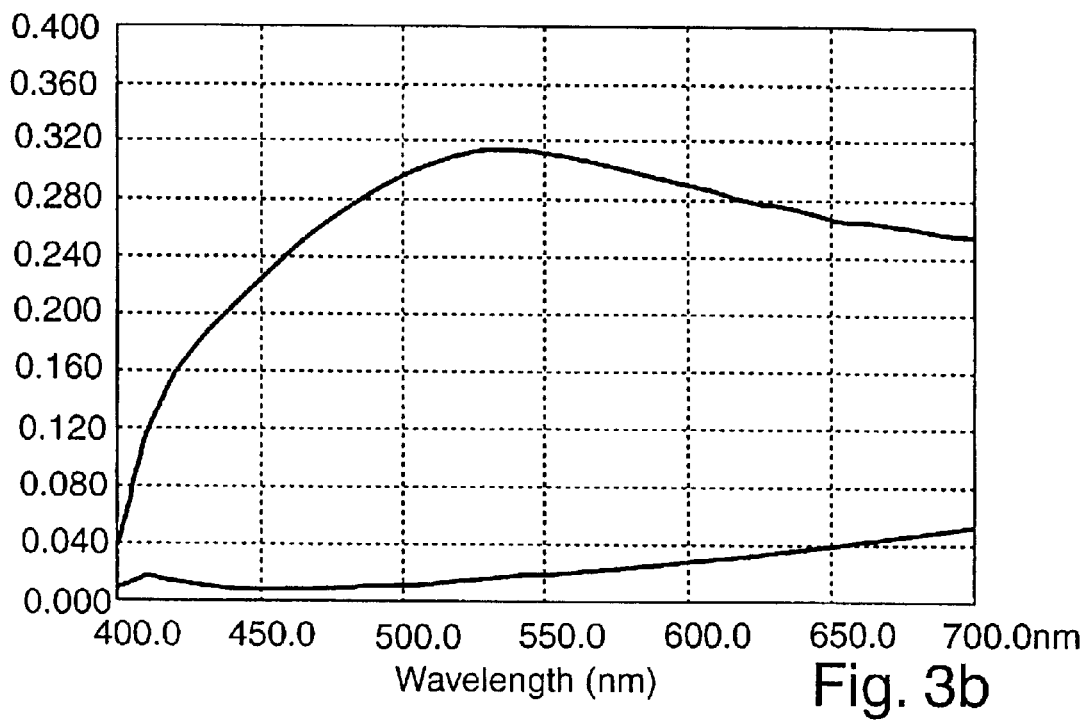

A first embodiment of this invention, as shown in FIGS. 3a and 3b, will hereinafter be described. This configuration, as schematically shown in FIG. 3a, comprises a right-handed 240° twisted nematic layer with an optical thickness of 0,76 μm. The display is of the normally black type. In this mode the off-state of the driven LC layer 5 is dark and the on-state is bright. Although this embodiment is described for the normally black mode, it is also possible to make a configuration in the normally white mode. Between the front polariser 1 and the front substrate 7, the above two retardation films 2, 3 are inserted. A film 3 with the retardation of 140 nm in combination with a polariser makes circularly polarised light. By adding a half-wave plate 2 of 280 nm in between, a wide-band quarter-wave plate is created, resulting in a better overall dark state. The slow axis of the film 3, which is adjacent to the substrate, makes an angle of 30° with the vertical y-axis of the device. The half-wave plate 2 makes an angle of 170° with the vertical y-axis. The absorption axis of the polariser makes an angle of 110° with the vertical y-axis. The LC layer 5 switches over 315 nm ($\approx \frac{1}{2} \cdot \lambda$). On the top of the back substrate 8, a left-handed colour filter is used. By using the above configuration a display, optimised for the highest brightness of the on-state is obtained, as seen in FIG. 3b.

Figure 4A:
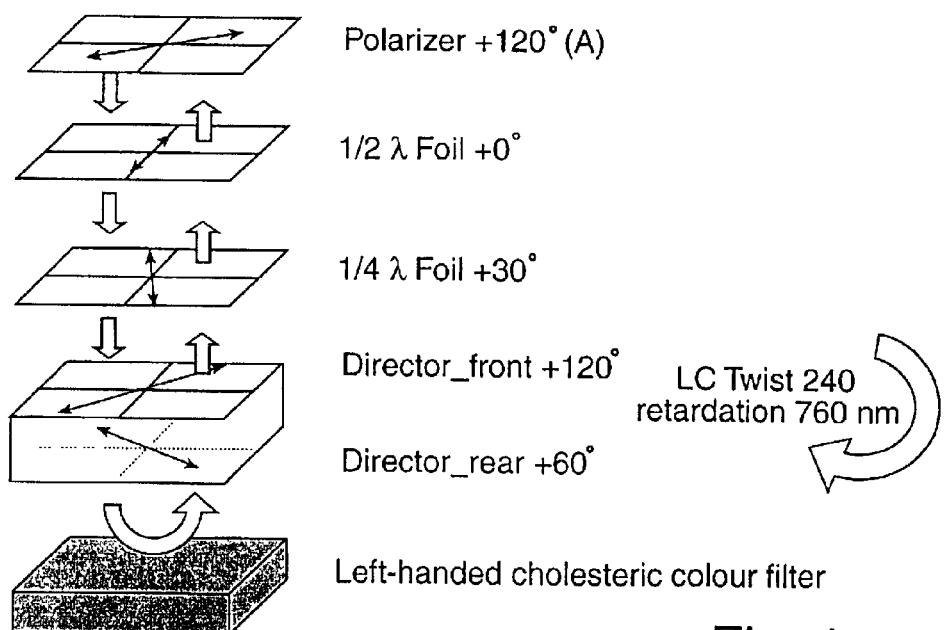
FIG. 4a is a diagram showing the optical principle mechanism in accordance with a computer simulation of a display in accordance with the invention, being optimised for obtaining high contrast.
Figure 4B:
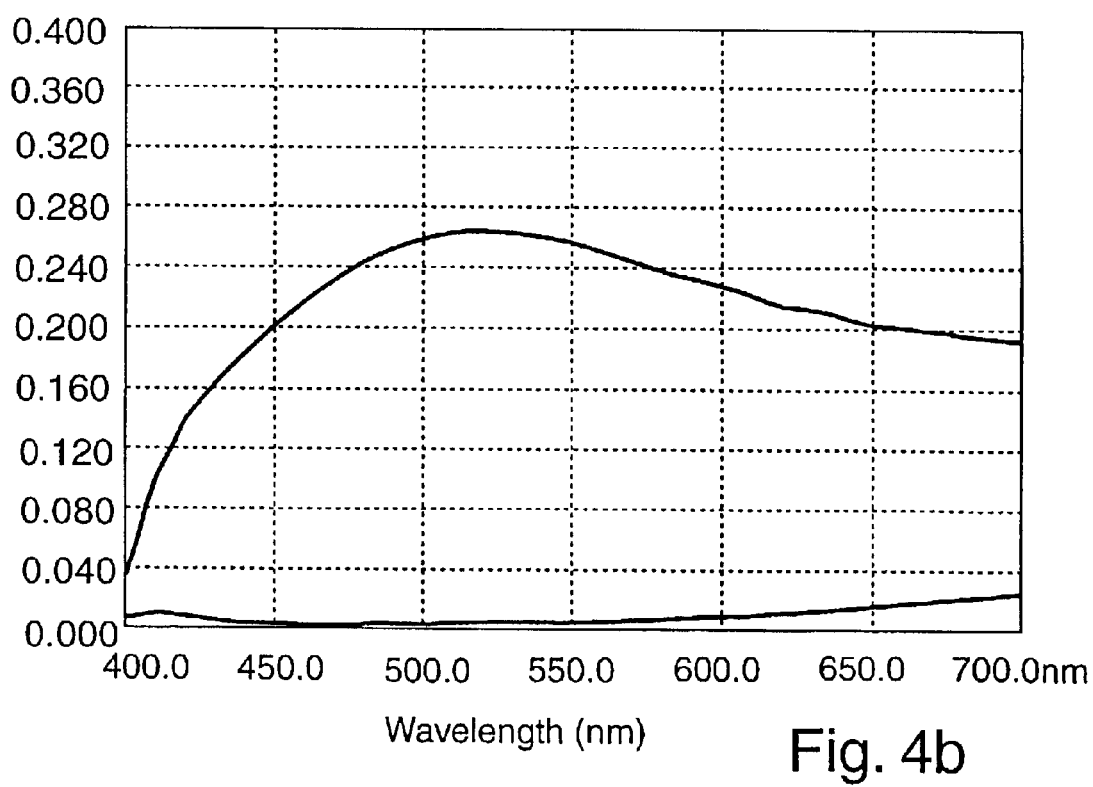

A second embodiment of this invention, as shown in FIGS. 4a and 4b, will hereinafter be described. This configuration, as schematically shown in FIG. 4a, comprises a right-handed 240° twisted nematic layer with an optical thickness of 0,76 μm. The display is of the normally black type. In this mode the off-state of the driven LC layer is dark and the on-state is bright. Although this embodiment is described for the normally black mode, it is also possible to make a configuration in the normally white mode. Between the front polariser 1 and the front substrate 7, the above two retardation films 2, 3 are inserted. A film 3 with the retardation of 140 nm in combination with a polariser makes circularly polarised light. By adding a half-wave plate 2 of 280 nm in between, a wide-band quarter-wave plate is created, resulting in a better overall dark state. The slow axis of the film 3, which is adjacent to the substrate, makes an angle of 30° with the vertical y-axis. The half-wave plate 2 makes an angle of 0° with the vertical y-axis. The absorption axis of the polariser makes an angle of 120° with the vertical y-axis. The LC layer 5 switches over 315 nm ($\approx \frac{1}{2} \cdot \lambda$). On the top of the back substrate 8, a left-handed colour filter is used. By using the above configuration a display, optimised for the highest contrast ratio is obtained, as seen in FIG. 4b.

In accordance with a third embodiment of the invention (not shown) the above described single super twisted nematic LC layer is exchanged for two super twisted nematic LC layers, having opposite twisting directions. In this specific example, the first layer, placed closer to the polariser, comprises a right-handed 230–250° (for example 245°) twisted nematic layer with an optical thickness of 0,75–0,85 μm (for example 0,79 μm) and the second layer, placed closer to the cholesteric colour filter layer, comprises a left-handed −240° twisted nematic layer with an optical thickness of 0,82 μm. However, many 9other configurations are possible. The display is of the normally black type. In this mode the off-state of the driven LC layer is dark and the on-state is bright. Although this embodiment is described for the normally black mode, it is also possible to make a configuration in the normally white mode. Between the front polariser 1 and the front substrate 7, the above two retardation films 2, 3 are inserted. A film 3 with the retardation of 140 nm in combination with a polariser makes circularly polarised light. By adding a half-wave plate 2 of 280 nm in between, a wide-band quarter-wave plate is created, resulting in a better overall dark state. The slow axis of the film 3, which is adjacent to the substrate, makes an angle of 40° with the vertical y-axis. The half-wave plate 2 makes an angle of 12° with the vertical y-axis. The absorption axis of the polariser makes an angle of 100° with the vertical y-axis. On the top of the back substrate 8, a left-handed colour filter layer is used.

The present invention should not be considered as being limited to the above-described embodiment, but rather includes all possible variations covered by the scope defined by the appended claims. Many combinations of twist angle and optical thickness being suitable for reflective STNs with cholesteric colour filters, besides the ones described above, are possible in order to optimise the display for different purposes. Consequently, the invention is by no means restricted to a twist angle of 240°, but other configurations differing in twist angle and optical thickness may be combined with cholesteric colour filters to give either normally black or normally white multiplexable reflective colour displays.

Further, it shall be understood that the above-specified numerical values for angles, retardations etc. are not absolute, but may vary with in an interval of at least approximately 10%.

What is claimed is:

1. A liquid crystal display device, comprising:

a polariser, at least two retardation films, a nematic liquid crystal layer, and a cross-linked, light reflecting RGB patterned cholesteric colour filter, wherein said liquid crystal layer is a super twisted nematic liquid crystal layer having a twist angle between 180 and 270 degrees, each of the retardation films in said at least two retardation films has a different optical axis with respect to a vertical y-axis, and the summed retardation R of the at least two retardation films and the liquid crystal layer is equal to approximately R=(3+2n)λ/4, where n=0, 1, 2, 3, and wherein said device comprises a further retardation film being a twisted nematic polymeric layer.

2. A liquid crystal display device as in claim 1, wherein said twisted nematic polymeric layer and said super twisted nematic liquid crystal layer have mutually opposite twist directions.

3. A liquid crystal display device as in claim 2, wherein the absorption axis of the polariser makes an angle of essentially 115°–125° with respect to a vertical y-axis of the device, wherein said device comprises a first and a second retardation film, said first retardation film having a retardation of about 280 nm and making an angle of essentially 0° with respect to said vertical y-axis, and said second retardation film having a retardation of about 140 nm and having a slow axis making an angle of about 25°–35° with respect to said vertical y-axis, said first and second retardation films together constituting a wide-band quarter-wave plate resulting in an improved overall dark state, whereby said twisted nematic polymeric layer, being placed closer to the polariser than said liquid crystal layer, comprises a right-handed 230–250° twisted nematic layer with an optical thickness between 0.75 and 0.85 μm, said liquid crystal layer being switchable over about 315 nm (≈½·λ) and comprises a left-handed twisted nematic layer having a twist angle between about −235 and −245 degrees and an optical thickness of about 0.82 μm.

4. A liquid crystal display device as in claim 1, wherein the absorption axis of the polariser makes an angle of essentially 115°–125° with respect to a vertical y-axis of the device, wherein said device comprises a first and a second retardation film, said first retardation film having a retardation of about 280 nm and making an angle of essentially 0° with respect to said vertical y-axis, and said second retardation film having a retardation of about 140 nm and having a slow axis making an angle of about 25°–35° with respect to said vertical y-axis, said first and second retardation films together constituting a wide-band quarter-wave plate resulting in an improved overall dark state, said twisted nematic polymeric layer, being placed closer to the polariser than said liquid crystal layer, comprises a right-handed 230–250° twisted nematic layer with an optical thickness between 0.75 and 0.85 μm, said liquid crystal layer being switchable over about 315 nm (≈½·λ) and comprises a left-handed twisted nematic layer having a twist angle between about −235 and −245 degrees and an optical thickness of about 0.82 μm.

* * * * *